3,376,314
HALODITHIOLEDIOXIDE AND ITS PRODUCTION

Don R. Baker, Pinole, George E. Lukes, El Cerrito, and Malcolm B. McClellan, San Jose, Calif., assignors to Stauffer Chemical Company, New York, N.Y., a corporation of Delaware
No Drawing. Filed July 29, 1964, Ser. No. 386,067
4 Claims. (Cl. 260—327)

ABSTRACT OF THE DISCLOSURE

The invention relates to a certain chlorinated 1,3-dithiolene composition corresponding to the formula

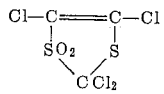

2,2,4,5-tetrachloro-$\Delta^4$-1,3-dithiolene-1,1-dioxide, its preparation and microbiological activity. Especially effective in the control of the fungi, *Aspergillus niger* and *Penicillium* sp. and the bacteria *Escherichia coli*. In soil it was found to control the fungi *Rhizoctonia solani* and *Fusarium solani*.

---

This invention relates to a certain chlorinated-1,3-dithiolene and its use in microbiocidal compositions. In particular, the invention relates to the compound corresponding to the formula

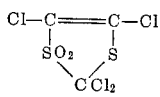

2,2,4,5 - tetrachloro - $\Delta^4$ - 1,3 - dithiolene - 1,1 - dioxide, its preparation and its utility. The compound is valuable for its microbiological activity.

The compound of the present invention can be prepared by the novel reaction between hexachloro-1,3,5-trithiane-1,1,3,3-tetroxide and a tertiary amine, such as triethylamine, or a salt of a carboxylic acid, such as sodium acetate. The reaction can be run in either aqueous or non-aqueous media. The desired product is then recovered and recrystallized from a suitable organic solvent. N-pentane was found to give good results.

Reference is now made to the following non-limiting examples which illustrate the preparation of the compound of the present invention.

Example 1

Preparation of 2,2,4,5-tetrachloro-$\Delta^4$-1,3-dithiolene-1,1-dioxide.—A 20.4 g. sample of hexachloro-1,3,5-trithiane - 1,1,3,3-tetroxide (0.05 moles) was suspended in 200 ml. of diethyl ether. To the ether solution was added 35 ml. of triethylamine (0.25 mole) in one portion. A mildly exothermic reaction occurred. The temperature was maintained with occasional ice-bath cooling below 33° C. for a period of 3 hours. The mixture was washed with 100 ml. of water, dried with anhydrous magnesium sulfate and filtered through fluorsil (200–400 mesh). The volatile materials were evaporated off in vacuo at room temperature to give a light colored yellow oil that rapidly began to darken. To this oil was quickly added 250 ml. of n-pentane and the mixture was then vigorously agitated. The pentane layer was decanted leaving 9.2 g. of dark residue that was discarded. The pentane layer was filtered through magnesium sulfate and concentrated in vacuo to 50 ml. volume. The solution was cooled and seeded with a sample prepared earlier. There was obtained 2.6 g. of crystals, M.P. 64–65° C.

*Analysis.*—Calculated for $C_3Cl_4S_2O_2$: C, 13.15%; H, 0.00%; Cl, 51.7%; S, 23.4%. Found: C, 13.04% H, 0.25%; Cl, 51.3%; S, 23.4%.

Example 2

Hexachloro - 1,3,5 - trithiane - 1,1,3,3 - tetroxide, 20.4 g. (0.05 mole), sodium acetate trihydrate, 54 g. (0.40 mole) and 80% aqueous isopropanol (100 ml.) were mixed together and heated to reflux for 40 minutes. The reaction mixture was cooled to room temperature. First, 100 ml. of n-pentane was added followed by 200 ml. of water. The aqueous layer was extracted with n-pentane (100 ml.). The combined n-pentane solutions were dried over anhydrous magnesium sulfate and evaporated in vacuo to a volume of approximately 30 ml. There was obtained 3.8 g. of crystals. The infrared spectrum of this material was in agreement with that obtained from Example 1, supra, using the tertiary amine, triethylamine.

The compound prepared by the aforedescribed procedures was tested as a fungicide according to the following methods.

*In vitro evaluation test.*—The compound was tested against growing fungi and bacteria in an artificial medium. Fungi and bacteria were tested in vitro starting with three 1-ounce vials partially filled, two (2) with malt broth and one (1) with nutrient broth. The compound to be tested was placed in the vials at desired concentrations (expressed in parts per million (p.p.m.)) and mixed with the broth. The vials were inoculated with a water suspension of spores of the desired fungi, *Aspergillus niger*, *Penicillium* sp., and cells of the bacteria *Escherichia coli* (one organism per vial). The bottles were then sealed and held for one week, after which time the results were observed and noted. Table 1 contains the data obtained in this manner.

Table 1.—In vitro vial test

| Organism: | Lowest effective concentration (p.p.m.) |
|---|---|
| *Aspergillus niger* | 5 |
| *Penicillium* sp. | 5 |
| *Escherichia coli* | 10 |

Soil incorporation test.—In the soil fungicide incorporation test, activity of the compound was determined against soil-borne pathogenic fungi. Two fungi were used and tested separately, *Rhizoctonia solani* and *Fusarium solani*. Each fungus was added to separate amounts of soil and then 1-pound portions were placed in quart jars. The chemical to be tested was pipetted into the fungus-infested soil at rates beginning at 110 p.p.m. and diluting until activity had been lost. Cotton was planted into the *Rhizoctonia solani*-infested and treated soil. Beans were planted into the *Fusarium solani*-infested and treated soil. Three to four weeks later the plants were inspected for disease symptoms. The lowest concentrations which prevented development of disease symptoms are reported. The following results in Table 2 were obtained with the chlorinated dithiolene dioxide of this invention.

Table 2.—Soil fungicide test

| Organism: | Lowest effective concentration (p.p.m.) |
|---|---|
| *Rhizoctonia solani* | [1] 27 |
| *Fusarium solani* | 5 |

[1] Partial control.

The compound of the present invention finds particular utility as a fungicide and may be applied in a variety of ways at various concentrations. It may be combined with suitable carriers and applied as dusts, sprays, or drenches. The amount applied will depend upon the nature of the utility. The rate of application may also vary with the microbiological use intended.

Various changes and modifications may be made without departing from the spirit and scope of the invention described herein as will be apparent to those skilled in the art to which it pertains. It is accordingly intended that the present invention shall only be limited by the scope of the appendetd claims.

We claim:
1. The method of preparing 2,2,4,5-tetrachloro-Δ⁴-1,3-dithiolene-1,1-dioxide, comprising reacting hexachloro-1,3,5-trithiane-1,1,3,3-tetroxide with at least one member of the group consisting of tertiary amines and salts of carboxylic acids and recovering the product therein produced.

2. The method of claim 1 wherein said tertiary amine is triethylamine.

3. The method of claim 1 wherein said salt of a carboxylic acid is sodium acetate.

4. The composition of matter, 2,2,4,5-tetrachloro-Δ⁴-1,3-dithiolene-1,1-dioxide, corresponding to the formula

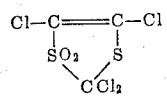

No references cited.

JAMES A. PATTEN, *Primary Examiner.*